United States Patent
Kimelman et al.

(10) Patent No.: US 11,200,170 B2
(45) Date of Patent: Dec. 14, 2021

(54) CACHE PRE-LOADING IN A DATA PROCESSING SYSTEM

(71) Applicant: NXP USA, Inc., Austin, TX (US)

(72) Inventors: Paul Kimelman, Alamo, CA (US); Brian Christopher Kahne, Austin, TX (US)

(73) Assignee: NXP USA, Inc., Austin, TX (US)

(*) Notice: Subject to any disclaimer, the term of this patent is extended or adjusted under 35 U.S.C. 154(b) by 85 days.

(21) Appl. No.: 16/703,156

(22) Filed: Dec. 4, 2019

(65) Prior Publication Data

US 2021/0173781 A1 Jun. 10, 2021

(51) Int. Cl.
*G06F 12/0862* (2016.01)

(52) U.S. Cl.
CPC .. *G06F 12/0862* (2013.01); *G06F 2212/1021* (2013.01); *G06F 2212/602* (2013.01)

(58) Field of Classification Search
CPC ......... G06F 12/0862; G06F 2212/1021; G06F 2212/602
See application file for complete search history.

(56) References Cited

U.S. PATENT DOCUMENTS

| | | | |
|---|---|---|---|
| 6,775,765 B1* | 8/2004 | Lee | G06F 9/30181 712/241 |
| 2002/0091915 A1* | 7/2002 | Parady | G06F 9/3832 712/225 |
| 2014/0115257 A1* | 4/2014 | Dundas | G06F 12/0862 711/125 |
| 2017/0010970 A1* | 1/2017 | Chou | G06F 12/0862 |

* cited by examiner

*Primary Examiner* — Sean D Rossiter

(57) ABSTRACT

A data processing system includes a processor, a memory, and a cache. The cache includes a cache array, cache control circuitry coupled to receive an access address corresponding to a read access request from the processor and configured to determine whether the received access address hits or misses in the cache array, pre-load control storage circuitry outside the cache array and configured to store a pre-load cache line address and a corresponding stride value, and pre-load control circuitry coupled to the cache control circuit rand the pre-load control storage circuitry. The pre-load control circuitry is configured to receive the access address corresponding to the read access request from the processor and selectively initiating a pre-load from the memory to the cache based on whether a cache line address portion of the access address matches the stored pre-load cache line address.

20 Claims, 10 Drawing Sheets

CACHE PRE-LOADING IN A DATA PROCESSING SYSTEM

BACKGROUND

Field

This disclosure relates generally to data processing systems, and more specifically, to a cache with cache pre-loading in a data processing system.

Related Art

Caches are typically used in data processing systems to speed up memory accesses by preventing the need for a processor of the data processing system to load data from or store data to the backing store, such as the main memory, which typically requires much longer access times. In current cache systems, speculative prefetching is utilized to bring instructions or data into the cache corresponding to a currently executing instruction stream in hopes that the prefetched information will be subsequently accessed. If the instruction stream continues down its predicted path, the accesses are faster because the required information has been prefetched into the cache. However, changes in instruction stream due to change of flow instructions, such as branches, result in mis-predicted prefetches which negatively impact performance.

For loop oriented code, such as in Machine Learning, cache loading is an important factor impacting cache performance. In one solution available today, one or more executable instructions or operations are inserted into the loop iterations to force a pre-load of data needed in the loop to improve cache utilization. However, this solution adds to the loop time, and in single issue data processing systems in which the loop iterations are very high, the performance of loop execution becomes unacceptable. Therefore, a need exists for a data processing system having improved cache pre-loading which may therefore provide for improved cache performance.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

In one aspect, a cache implements pre-loading automation based on loop behavior, taking into consideration the strides used and the cache line lengths. A control register allows for storing of a pre-load address and corresponding stride, which is used by the pre-loading control circuitry of the cache, along with the current access address, to determine when to pre-load a next cache line into the cache and when to update the pre-load address. In this manner, by having hardware monitor access addresses for cache pre-loading, improved cache pre-loading can be achieved without adding execution time to each loop iteration. This can be especially helpful for machine learning applications which typically includes a lot of linear algebra and matrix operations, in which the values are stored in memory in a variety of different ways and not just in linear fashion.

Figure 1:
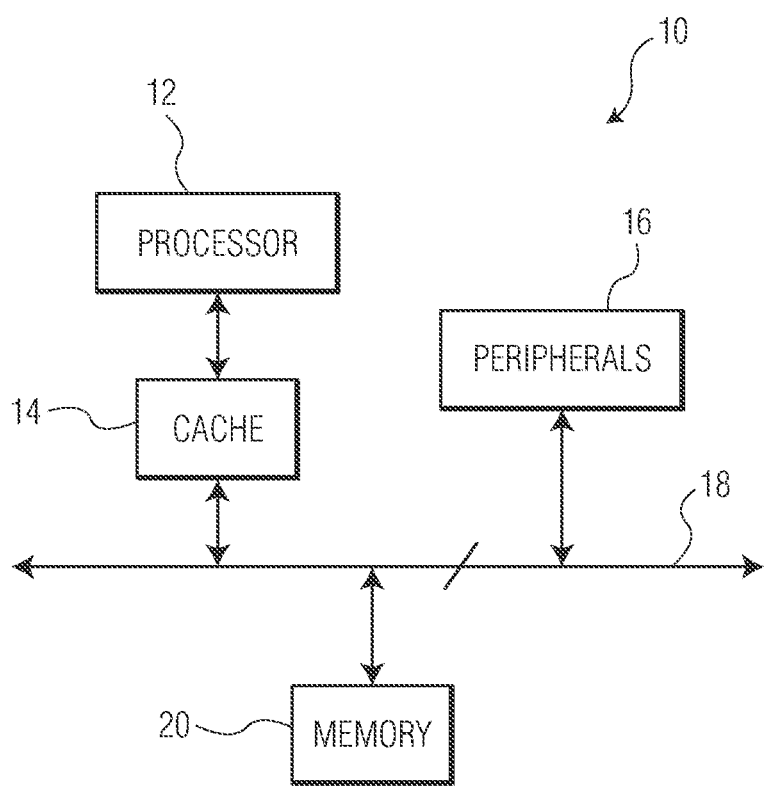
FIG. 1 illustrates, in block diagram form, a data processing system having a cache, in accordance with one embodiment of the present invention.

FIG. 1 illustrates, in block diagram form, a data processing system 10 having a processor 12, cache 14, one or more peripherals 16, a system interconnect 18, and a memory 20. Data processing system 10 may be any type of processing system, such as, for example, a microprocessor, digital signal processor, etc., or any other type of bus master. Peripherals 16 are bidirectionally coupled to system interconnect 18 and may include any number of peripherals, as needed, or may not be present at all. System interconnect 18 may be a system bus, or any other type of interconnect, such as a cross-bar switch. Memory 20 is bidirectionally coupled to system interconnect 18 and may be any type of memory, such as, for example, random access memory (RAM), read only memory (ROM), non-volatile memory (e.g. flash), etc. Memory 20 may be referred to as system memory and is the backing store for cache 14. In the illustrated embodiment, cache 14 is coupled between processor 12 and system interconnect 14, in which cache 14 is bidirectionally coupled to each of processor 12 and system interconnect 18. In the illustrated embodiment, processor 12 is tightly coupled to cache 14 and communicates directly with cache 14. Alternatively, processor 12 can also be bidirectionally coupled to system interconnect 18 and would communicate with cache 14 via system interconnect 18. Processor 12 is capable of executing processor instructions, and may be a processor core or central processing unit (CPU) of data processing system 10. Cache 14 stores a subset of memory 20 which allows processor 12 to perform loads and stores quicker as compared to accessing memory 20 via system interconnect 18. Cache 14 may be any level cache, such as, for example, a level 1 (L1) or level 2 (L2) cache. The elements of data processing system 10 all operate as known in the art, with the exception of cache 14, described in more detail in reference to FIGS. 2-10 below.

Figure 2:
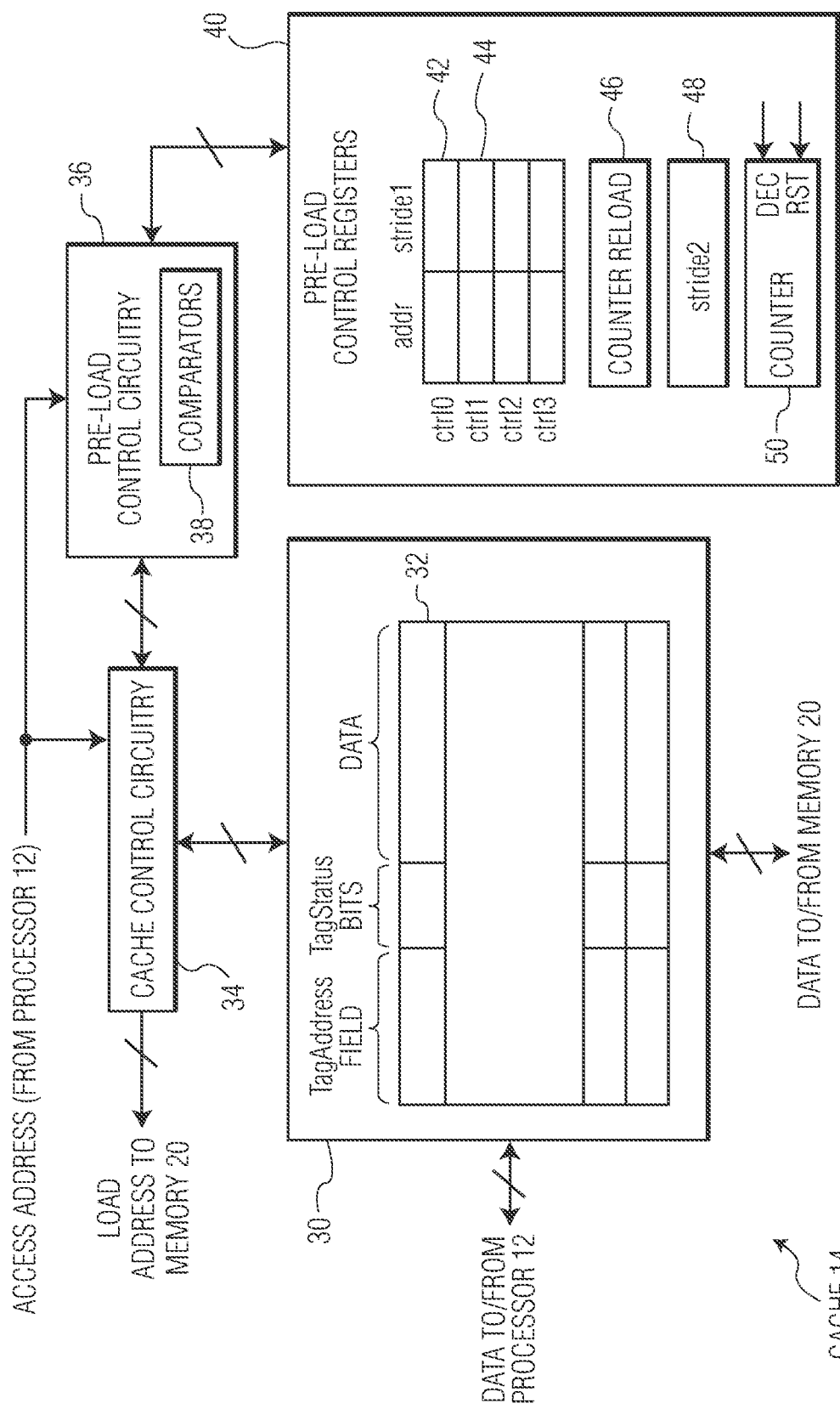
FIG. 2 illustrates, in block diagram form, a more detailed view of the cache of FIG. 1, in accordance with one embodiment of the present invention.

FIG. 2 illustrates, in block diagram form, a more detailed view of the cache of FIG. 1, in accordance with one embodiment of the present invention. Alternate embodiments of cache 14 may use a different structure than that illustrated in FIG. 2. For simplicity, cache 14 is illustrated as a direct mapped cache. However, in alternate embodiments, cache 14 may be a more complex multi-way, set-associative cache. Cache 14 includes cache circuitry 30, cache control circuitry 34 bidirectionally coupled to cache circuitry 30, pre-load control circuitry 36 bidirectionally coupled to cache control circuitry 34, and pre-load control registers 40 bidirectionally coupled to pre-load control circuitry 36. An access address from processor 12 is provided to cache control circuitry 34 and pre-load control circuitry 36. Cache control circuitry 34 also communicates with processor 12 and memory 20.

In the illustrated embodiment, cache circuitry 30 (also referred to as a cache array) is storage circuitry which stores information in each of a plurality of cache lines or entries. For example, cache circuitry 30 includes tag address, tag status, and cache data fields for the cache lines or entries.

The tag status field may include any number of status bits for each corresponding entry, such as a valid bit to indicate whether or not the corresponding entry is a valid entry. Cache line entry 32 is an example cache line of cache circuitry 30. In the illustrated embodiment, cache 14 is a unified cache in which cache circuitry 30 is capable of storing multiple types of information, including instruction information or data information (e.g. operand information). Alternatively, cache 14 can be an instruction cache in which cache circuitry 30 only stores instruction information.

Although one type of architecture for cache 14 has been illustrated in FIG. 2, alternate embodiments of cache 14 may use any desired or appropriate architecture. The architecture illustrated in FIG. 2 is merely intended to be one possible representative architecture.

In operation, an access address for a read or write access request is provided by processor 12 to cache 14. The access address is an address in memory 20 that processor 12 is accessing for a read (load) or write (store) operation. If that access address resides in cache circuitry 30, then, for a read operation, read data can be returned from cache circuitry 30 to processor 12 rather than having to access memory 20 or, for a write operation, write data provided with the access address can be written into a cache line of cache circuitry 30 and at some point, it can be written to memory 20. In this manner, memory accesses can be completed with reduced access times with cache 14 as compared to always needing to go to memory 20.

For any access request, the access address provided as part of the access request is provided to cache control circuitry 34 and pre-load control circuitry 36. The access request may also include write data for write access requests, and may include other control information, such as, for example, a R/W bit which indicates a read or write operation. Operation will first be described in reference to cache control circuitry 34, and pre-load control circuitry 36 will be addressed further below. For a read access request, cache control circuitry 34 receives the access address from processor 12 and, using a portion of the access address to compare to the tag address fields of the cache lines of cache circuitry 30, determines whether the access address results in a hit or a miss in the cache. This portion of the access address may be referred to as the tag address portion or line address portion of the access address, which, in one embodiment, is the higher order bits of the access address. If the access address results in a hit (indicating that the portion of the access address matched a tag address field of a valid cache line, as indicated by the valid bit of the matching cache line), the data field of the matching entry is returned to processor 12. If the access address results in a miss (indicating a match with a valid cache line was not found), cache control circuitry 34 provides the access address to memory 20, via interconnect 18, so that memory 20 can instead complete the read access and provide the requested read data to processor 12. In one embodiment, in case of a miss, the read data is also provided to cache control circuitry 34 so that a cache line can be allocated in cache circuitry 30 for the access address which missed and its corresponding read data. In this manner, a subsequent read access of the access address may result in a cache hit (assuming the cache line has not subsequently been evicted). When a new cache line is allocated, note that typically, an entire cache line, which includes the requested read data, is loaded from memory 20 into the allocated cache line.

For a write access request, cache control circuitry 34 receives the access address from processor 12 and, using a portion of the access address to compare to the tag address fields of the cache lines of cache circuitry 30, determines whether the access address results in a hit or a miss in the cache. If the access address results in a hit (indicating that the portion of the access address matched a tag address field of a valid cache line, as indicated by the valid bit of the matching cache line), write data provided as part of the write access request is written into the data field of the matching cache line and the valid bit of the matching cache line is set to indicate a valid cache line. If the access address results in a miss (indicating a match with a valid cache line was not found), cache control circuitry 34 allocates a new cache line in cache circuitry 30 to store the access address and the corresponding write data. In the case of a write-though cache, at the time a new cache line is allocated in response to the miss, the access address and write data is provided to memory 20 for storage into memory 20 to maintain memory coherency. In the case of a write-back cache, at a later time, newly allocated cache lines are written to memory 20 to maintain memory coherency. Note that in this case, the tag status bits may also provide coherency information to indicate whether data stored in corresponding cache line is coherent with memory 20. Note that determining hit or misses in cache circuitry 30, allocating new cache lines and evicting cache lines in cache circuitry, and implementing write-through or write-back cache policies may all be performed as known in the art by cache control circuitry 34, using any variety of known methods. Further, additional details of the circuitry in cache control circuitry 34 and cache circuitry 30 to implement these operations is not provided in FIG. 2 because they are known in the art.

With respect to pre-load control circuitry 36, each access address from processor 12 is also provided to pre-load control circuitry 36 in addition to being provided to cache control circuitry 34. Pre-load control circuitry 36 includes comparators 38, and communicates with pre-load control register 40. Pre-load control registers 40 includes four control registers, ctrl0-ctrl3. Entry 42 and entry 44 correspond to ctrl0 and ctrl1, respectively, and can be referred to as ctrl0 42 and ctrl1 44, and will be used as examples for FIGS. 3-10. Each of these control registers includes an address (addr) field (which stores a pre-load cache line address) and a stride1 field (which stores a corresponding stride value for the cache line address). In alternate embodiments, pre-load control registers 40 can include any number of control registers similar to ctrl0-ctrl3. Pre-load control registers 40 also includes a counter reload register 46 which stores a counter reload value, a stride2 register 48 which stores a stride2 value, and a counter 50. Counter 50 is a register which stores a counter value (or count value) and has a decrement control input (DEC) and a reset input (RST). When DEC is asserted, the counter value is decremented by one and when RST is asserted, the counter value in counter reload register 46 is loaded into counter 50. Note that counter 50 can be implemented using any type of counter and may include additional inputs and may be incremented instead of decremented.

Figure 3:
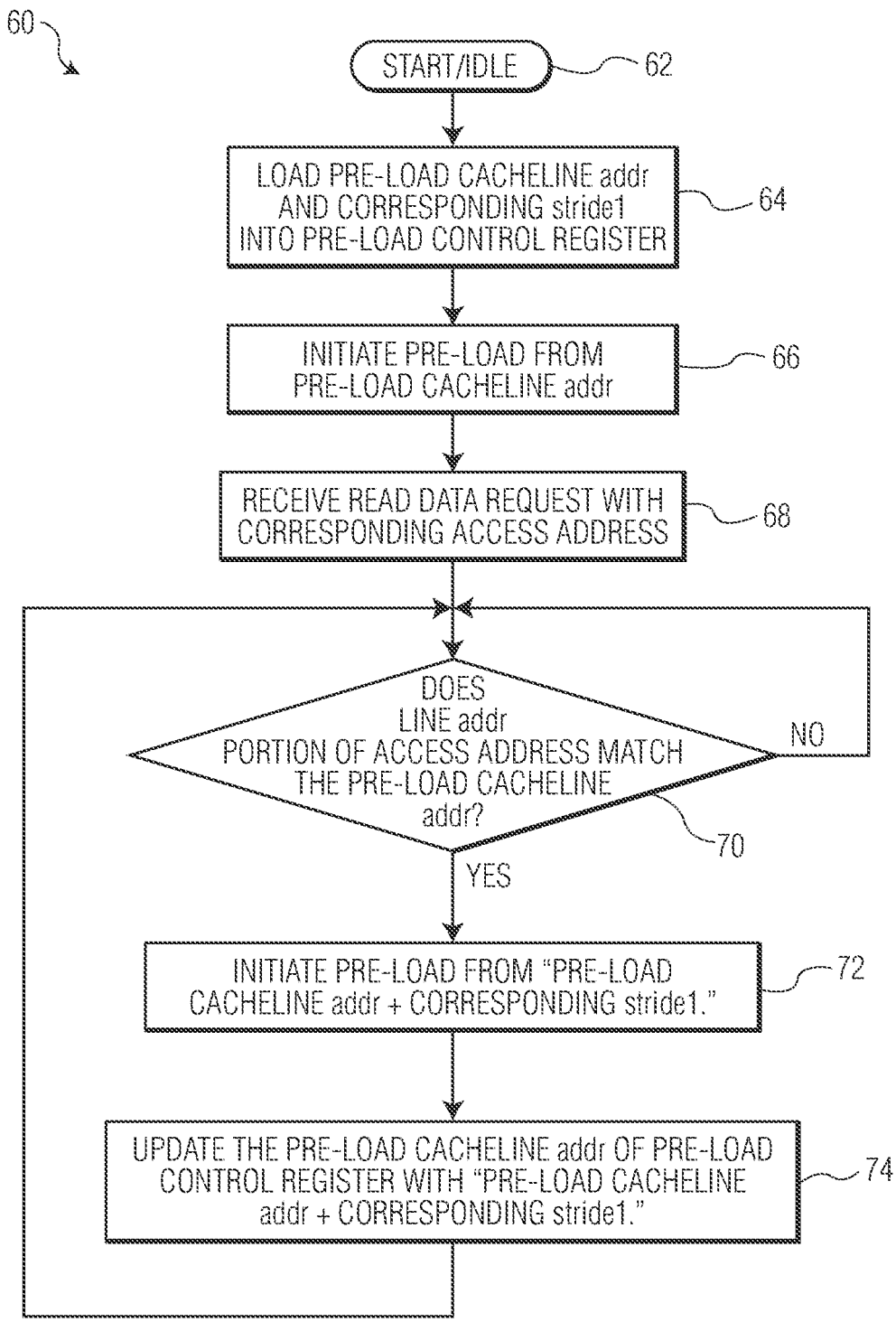
FIGS. 3 and 4 illustrate, in flow diagram form, methods of performing cache pre-loading by the cache of FIG. 2 in accordance with embodiments of the present invention.
Figure 4:
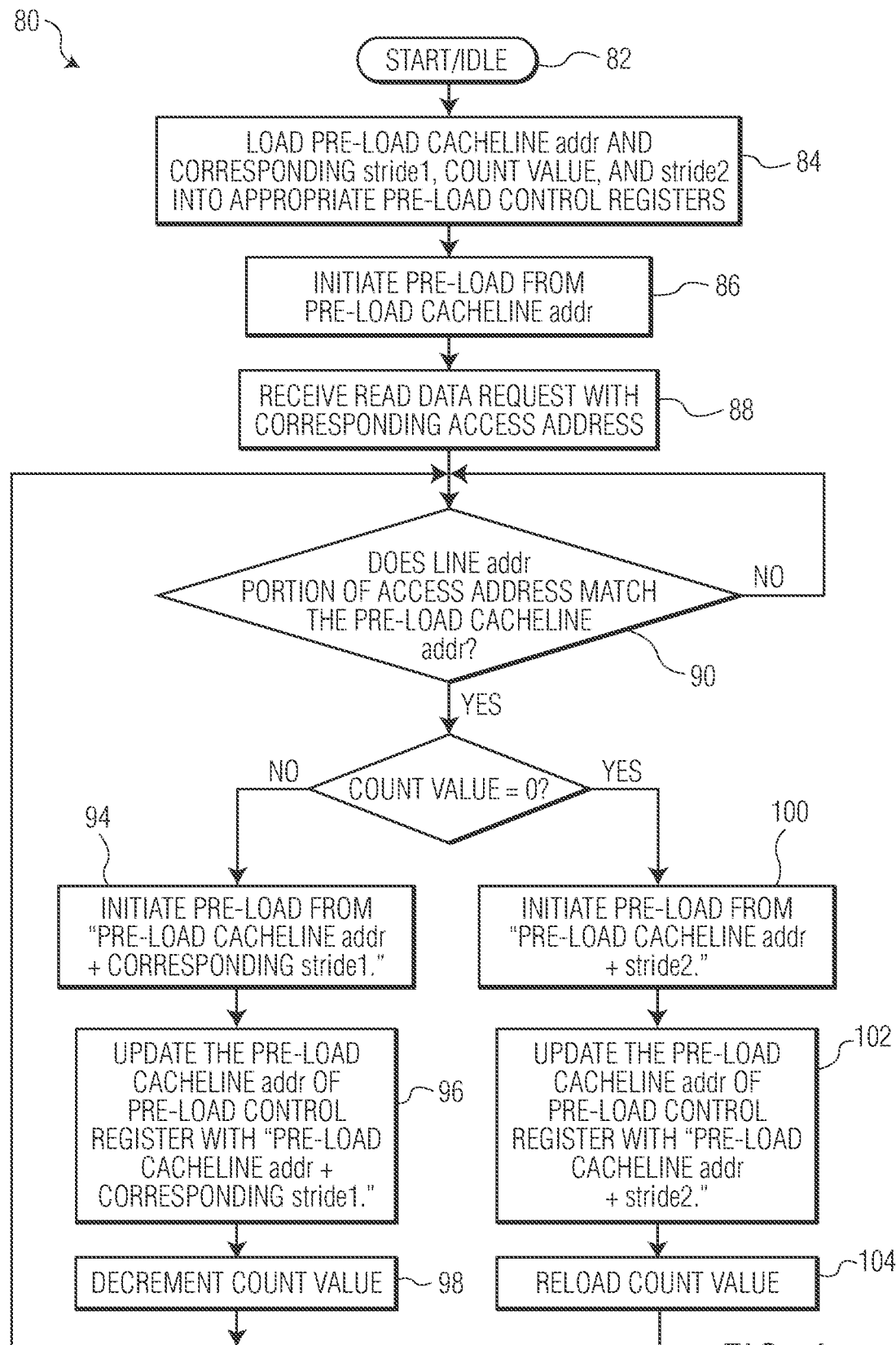

In operation, at least a portion of pre-load control registers 40 is loaded with one or more pre-loaded cache line address, and pre-load control circuitry 36 monitors addresses of memory 20 which are accessed. When an access address received from processor 12 matches a pre-load cache line address in control registers 40, a new cache line is pre-loaded into cache circuitry 30, taking into consideration the corresponding stride value, and the matching pre-load cache line address in control register 40 is updated with a new pre-load cache line address. Pre-loading cache lines in this manner helps improve loop execution efficiency without impacting loop timing. Furthermore, the use of corresponding stride information also improves efficiency of linear algebra and other machine learning (ML) and artificial intelligence (AI) type operations. FIGS. 3 and 4 illustrate, in flow diagram form, methods of operating cache 14 with respect to pre-load control circuitry 36 and pre-load control registers 40, in accordance with embodiments of the present invention. FIGS. 5-10 walk through specific examples of the methods of FIGS. 3 and 4 performed on matrices A and B.

FIG. 3 illustrates a method 60 of operating cache 14 from the perspective of pre-load control circuitry 36, which uses comparators 38 and control registers ctrl0-ctrl3. Note that counter reload register 46, stride2 register 48, and counter 50 are not used in method 60, but will be used in the example operation of FIG. 4. Therefore, these particular elements may not be present in pre-load control registers 40, depending on the embodiment. Method 60 begins with pre-load control circuitry 36 being in the start or idle state at block 62, and will be described using ctrl0 42 as an example. At block 64, pre-load control circuitry 36 loads a pre-load cache line address (also referred to as a pre-load tag address) into the addr field of ctrl0 42, and a corresponding stride value into the stride1 field of ctrl0 42. At block 66, pre-load control circuitry 36 initiates a pre-load from the pre-load cache line address in the addr field of ctrl0 42 from memory 20 into cache circuitry 30. Note that the pre-loading operation can continue, as needed, to complete. In initiating the pre-load, pre-load control circuitry 36 may direct cache control circuitry 34 to load the cache line from memory 20 into an allocated line within cache circuitry 30 and set the tag address field and tag status bits accordingly. In an alternate embodiment, this pre-load may not yet be initiated, and method 60 would proceed directly to block 68 from block 64.

At block 68, a read access request having a corresponding access address is received from processor 12. (The read access request is also provided to cache control circuitry 34 and processed, as described above with respect to cache control circuitry 34). At decision diamond 70, in response to receiving the read access request, pre-load control circuitry 36 determines if the cache line address portion (i.e. tag address portion) of the access address matches the pre-load cache line address in ctrl0 42, using, for example, comparators 38. If not, nothing more happens, and method 60 returns to block 68 until a next read access request is received. That is, in this case, no pre-loads from memory 20 into cache 14 and no modifications of ctrl0 are performed in response to the received read access request.

However, if there is a match at decision diamond 70, then at block 72, pre-load control circuitry 36 initiates a pre-load from the address provided by "pre-load cache line addr of ctrl0+stride1 of ctrl0". As described above, in doing so, pre-load control circuitry 36 may direct cache control circuitry 34 to load the requested cache line from memory 20 into an allocated line within cache circuitry 30 and set the tag address field and tag status bits accordingly. While cache control circuitry 34 performs the pre-load, pre-load control circuitry 36 updates the pre-load cache line addr field of ctrl0 with "pre-load cache line addr of ctrl0+stride1 of ctrl0" at block 74. That is, the addr field is updated with the next cache line address (according to stride1) whose pre-loading was initiated in block 72. Note that the updating of block 74 can occur while the pre-load initiated in block 72 is being performed. Method 60 then returns to block 68 until a next read access request is received.

Note that method 60 can be performed for each of ctrl0-ctrl3, as needed. In one embodiment, a user controls what values pre-load control circuitry 36 loads into ctrl0-ctrl3, based on the code to be executed by processor 12. In alternate embodiment, a compiler or code profiler of processor 12 can make the determinations and direct pre-load control circuitry 36 accordingly to load ctrl0-ctrl3. In one embodiment, comparators 38 includes a plurality of comparators, in which each comparator compares the received read access address with a corresponding addr field of ctrl0-ctrl3. Also, in an alternate embodiment, at block 72, rather initiating a pre-load from the address provided by "pre-load cache line addr of ctrl0+stride1 of ctrl0", the pre-load can be initiated from an address calculated in other ways from the pre-load cache line addr of ctrl0 and stride1 of ctrl0, such as, for example, by subtracting the stride1 value. The pre-load control register can also be updated accordingly, with the newly calculated address.

FIG. 4 illustrates a method 80 of operating cache 14 from the perspective of pre-load control circuitry 36, which uses counter reload register 46, stride2 register 48, and counter 50, in addition to comparator 38 and control registers ctrl0-ctrl3. Method 80 begins with pre-load control circuitry 36 being in the start or idle state at block 82, and will also be described using ctrl0 42 as an example. At block 84, pre-load control circuitry 36 loads a pre-load cache line address (also referred to as a pre-load tag address) into the addr field of ctrl0 42, and a corresponding stride value into the stride1 field of ctrl0 42. Pre-load control circuitry 36 also loads a counter reload value into counter reload register 46 and a stride2 value into stride2 register 48, and resets counter 50 with the counter reload value. For example, in one embodiment, pre-load control circuitry 36 asserts the RST input of counter 50, and upon resetting counter 50, the counter reload value is loaded into counter 50.

At block 86, pre-load control circuitry 36 initiates a pre-load from the pre-load cache line address in the addr field of ctrl0 42 from memory 20 into cache circuitry 30. Note that the pre-loading operation can continue, as needed, to complete as other processing occurs. In initiating the pre-load, pre-load control circuitry 36 may direct cache control circuitry 34 to load the cache line from memory 20 into an allocated line within cache circuitry 30 and set the tag address field and tag status bits accordingly. In an alternate embodiment, this pre-load may not yet be initiated, and method 80 would proceed directly to block 88 from block 84.

At block 88, a read access request having a corresponding access address is received from processor 12. (The read access request is also provided to cache control circuitry 34 and processed, as described above with respect to cache control circuitry 34). At decision diamond 90, in response to receive the read access request, pre-load control circuitry 36 determines if the cache line address portion (i.e. tag address portion) of the access address matches the pre-load cache line address in ctrl0 42, using, for example, comparators 38. If not, nothing more happens, and method 80 returns to block 88 until a next read access request is received. That is, in this case, no pre-loads from memory 20 into cache 14 and no modifications of ctrl0 are performed in response to the received read access request. However, if there is a match at decision diamond 90, then method 80 proceeds to decision diamond 92 in which it is determined whether the count value of counter 50 has expired (e.g. corresponding to a value of zero in the current embodiment).

If the count value of counter 50 is not yet zero, indicating that counter 50 has not yet expired, method 80 proceeds to block 94 in which pre-load control circuitry 36 initiates a pre-load from the address provided by "pre-load cache line addr of ctrl0+stride1 of ctrl0", similar to block 72 in FIG. 3. In doing so, pre-load control circuitry 36 may direct cache control circuitry 34 to load the requested cache line from memory 20 into an allocated line within cache circuitry 30 and set the tag address field and tag status bits accordingly. While cache control circuitry 34 performs the pre-load, pre-load control circuitry 36 can update the pre-load cache line addr field of ctrl0 with "pre-load cache line addr of ctrl0+stride1 of ctrl0" at block 96. That is, the addr field is updated with the next cache line address (according to stride1) whose pre-loading was initiated in block 94. Note that block 96 is similar to block 74 in FIG. 3, and that the updating in block 96 can occur while the pre-load initiated in block 94 is being performed. Method 80 then continues to block 98 in which the counter value in counter 50 is decremented by asserting the DEC input of counter 50. Method 80 then returns to block 88 until a next read access request is received.

At decision diamond 92, if the count value of counter 50 is zero, indicating that counter 50 has expired, method 80 continues to block 100 in which pre-load control circuitry 36 initiates a pre-load from the address provided by "pre-load cache line addr of ctrl0+stride2". In this manner, by using a second stride value in addition to stride1, data can be more efficiently pre-loaded, as will be described with respect to matrices in the example of FIGS. 5-10. For block 100, pre-load control circuitry 36 may direct cache control circuitry 34 to load the requested cache line from memory 20 into an allocated line within cache circuitry 30 and set the tag address field and tag status bits accordingly. While cache control circuitry 34 performs the pre-load, pre-load control circuitry 36 can update the pre-load cache line addr field of ctrl0 with "pre-load cache line addr of ctrl0+stride2" at block 102. That is, the addr field is updated with the next cache line address (according to stride2) whose pre-load was initiated in block 100. Method 80 then continues to block 104 in which counter 50 is reset with the counter reload value. Method 80 then returns to block 88 until a next read access request is received.

As with method 60, method 80 can also be performed for each of ctrl0-ctrl3, as needed. In one embodiment, a user controls what values pre-load control circuitry 36 loads into ctrl0-ctrl3, as well as the other control registers, based on the code to be executed by processor 12. In alternate embodiment, a compiler or code profiler of processor 12 can make the determinations and direct pre-load control circuitry 36 accordingly to load ctrl0-ctrl3 and the other control registers. Also, in an alternate embodiment, at block 94, rather initiating a pre-load from the address provided by "pre-load cache line addr of ctrl0+stride1 of ctrl0", the pre-load can be initiated from an address calculated in other ways from the pre-load cache line addr of ctrl0 and stride1 of ctrl0, such as, for example, by subtracting the stride1 value. The pre-load control register can also be updated accordingly, with the newly calculated address. As will be described further below, stride2 can be a positive or negative value and can be used in different ways depending on the embodiment.

Figure 5:
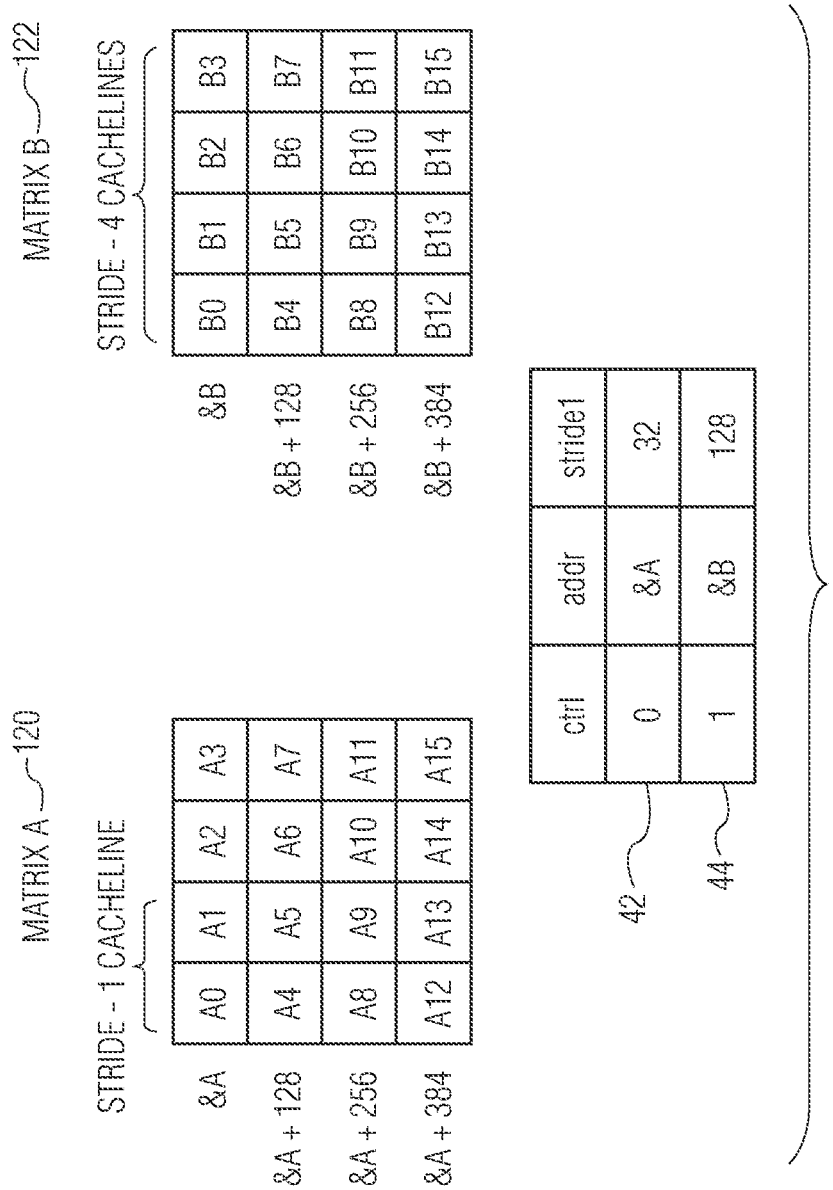
FIGS. 5-10 illustrate, in diagrammatic form, various steps of example cache pre-load operations performed by the cache of FIG. 2 in accordance with embodiments of the present invention.

FIGS. 5-10 illustrate, in diagrammatic form, various steps of example cache pre-load operations performed by the cache of FIG. 2 for a portion of a matrix multiplication, in accordance with embodiments of the present invention. Illustrated in FIG. 5, is a matrix A 120 and matrix B 122. Matrix A 120 includes elements A0-A15 and matrix B 122 includes elements B0-B15, in which each element of the matrix is a cache line length (for example, 32 bytes in the illustrated example). Elements A0-A15 of matrix A are stored linearly starting at address location &A in which elements A0-A3 are stored starting at &A, elements A4-A7 are stored starting at &A+128, elements A8-A11 are stored starting at &A+256, and elements A12-A15 are stored starting at &A_384.

Note that the "&" preceding a value indicates an address location (i.e. address value), in which each addressable address location stores one byte, such that &A+128 refers to an address location that is 128 bytes from address location A, and &A+384 refers to an address location that is 384 bytes from address location A. Since each element of matrix A is a cache line in size, and each cache line is 32 bytes in the illustrated embodiment, each row includes 4×32 bytes (or 128 bytes). Therefore, the first row starts at &A which stores A0, the second row starts at &A+128 which stores A4, the third row starts at &A+256 which stores A8, etc. The stride between each element within a row of matrix A is 1 cache line. For example, A1 is stored one cache line (or 32 bytes) from A0, A2 is stored one cache line (32 bytes) from A1, etc.

Similar descriptions apply to matrix B 122. Elements B0-B15 are stored linearly starting at address location &B, in which elements B0-B3 are stored starting at &B, elements B4-B7 are stored starting at &B+128, elements B8-B11 are stored starting at &B+256, and elements B12-B15 are stored starting at &B_38. As with matrix A 120, since each element of matrix B is a cache line in size, and each cache line is 32 bytes in the illustrated embodiment, each row includes 4×32 bytes (or 128 bytes). Therefore, the first row starts at &B which stores B0, the second row starts at &B+128 which stores B4, the third row starts at &B+256 which stores B8, etc. While the stride between elements of each row in matrix B is 1 cache line, the stride between an element in one row to an element in the same position in an adjacent row is 4 cache lines. For example, B4 is stored 4 cache lines from B0, B8 is stored 4 cache lines from B4. Similarly, B5 is stored 4 caches line from B1 (in which B1 and B5 are in analogous positions in their respective rows).

Referring to the example of FIG. 5, the initial operations are illustrated for a matrix multiplication of "matrix A×matrix B". Pre-load control circuitry 36 loads the cache line address of element A0 (corresponding to &A) into the addr field of ctrl0 42 and 32 (1 cache line) into the stride1 field of cntrl0 42, and loads the cache line address of element B0 (corresponding to &B) into the addr field of ctrl1 44 and 128 (4 cache lines) into the stride1 field of ctrl1 44. In the current example, stride2 is not used. Upon pre-load control circuitry 36 loading ctrl0 and ctrl1, a pre-load from &A and &B is initiated from memory 20 into cache circuitry 30 (as was described above in reference to blocks 66 and 86 above).

Figure 6:
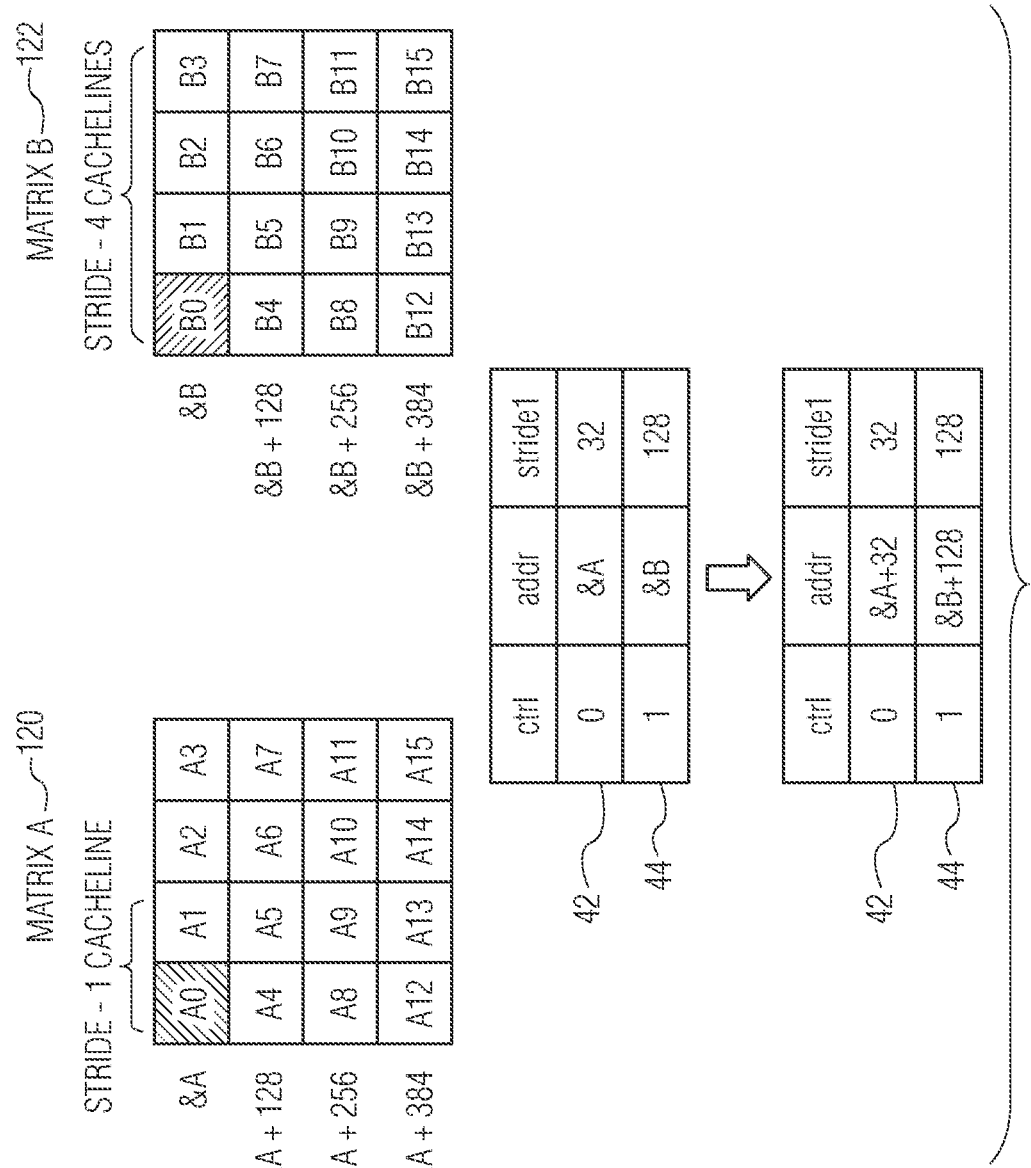

In FIG. 6, it is assumed that processor 12 provides read requests to access the highlighted matrix elements A0 (at address location &A) and B0 (at address location &B) so as to be able to multiply A0 and B0 for the matrix multiplication. With this operation, a cache line portion of the access address of a read access request for A0 (corresponding to &A) matches the pre-loaded cache line address &A stored in ctrl0 42. Due to this match, a new pre-load from &A+stride1 (=&A+32) is initiated from memory 20 into cache circuitry 30. Similarly, a cache line portion of the access address of a read access request for B0 (corresponding to &B) matches the pre-loaded cache line address &B stored in ctrl1 44. Due to this match, a new pre-load from &B+stride1 (=&B+128) is initiated from memory 20 into cache circuitry 30. These operations are described in reference to blocks 68, 70, and 72 above, and are performed in hopes that subsequent accesses will be made to the pre-loaded cache lines such that these subsequent accesses result in cache hits in cache circuitry 30 rather than cache misses. Cache misses are slower to service as they require accessing memory 20 to obtain the read data, whereas cache hits are serviced from the cache, without needing to access memory 20.

In addition to initiating the pre-loads from memory 20 into cache 14, ctrl0 and ctrl1 are both updated, as described above in reference to block 74. The addr field of ctrl0 42 is updated with the "addr+stride1" of ctrl0, which is &A+32. Similarly, the addr field of ctrl1 44 is updated with the "addr+stride1" of ctrl1 which is &B+128. Note that only the addr fields are updated, and the stride1 fields remain unchanged.

Figure 7:
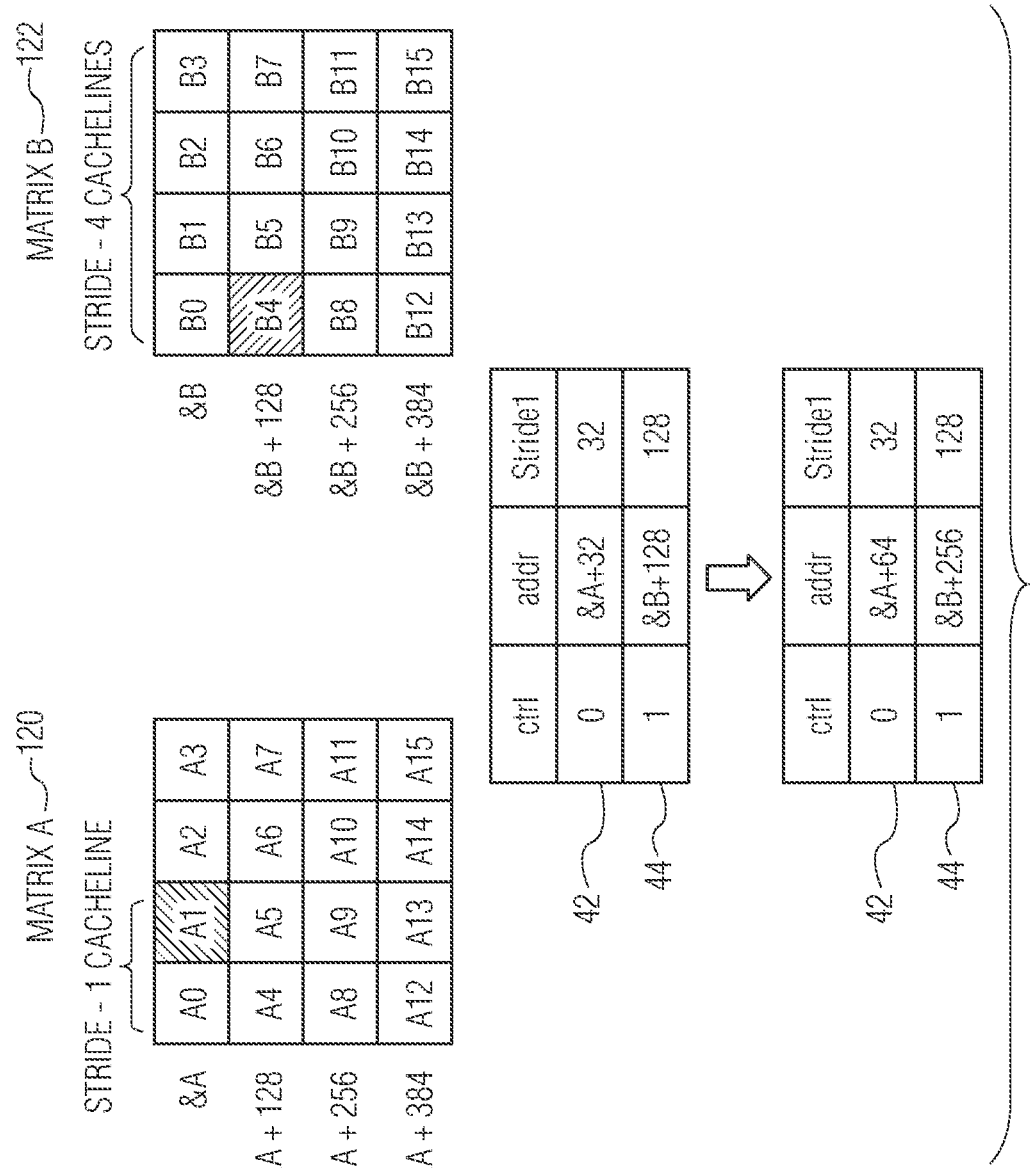

In FIG. 7, illustrating the continuation with the matrix multiplication at a later point in time, it is assumed that processor 12 provides read requests to access the highlighted matrix elements A1 (at address location &A+32) and B4 (at address location &B+128) so as to be able to continue with the matrix multiplication. (Note that these read accesses should hit in cache 14 due to the previously performed cache pre-loads, thus allowing for improved efficiency.) With these read requests, a cache line portion of the access address of a read request for A1 (corresponding to &A+32) matches the pre-loaded cache line address &A+32 currently stored in ctrl0 42, and a cache line portion of an access address of a read access request for B4 (corresponding to &B+128) matches the pre-loaded cache line address &B+128 currently stored in ctrl1 44. Due to these matches, new pre-loads from &A+stride1 (=&A+32+32=&A+64) and &B+stride1 (=&B+128+128=&B+256) are initiated from memory 20 into cache circuitry 30. Also, ctrl0 and ctrl1 are both updated. The addr field of ctrl0 42 is updated with the "addr+stride1" of ctrl0, which is &A+64. Similarly, the addr field of ctrl1 44 is updated with the "addr+stride1" of ctrl1 which is &B+256.

Figure 8:
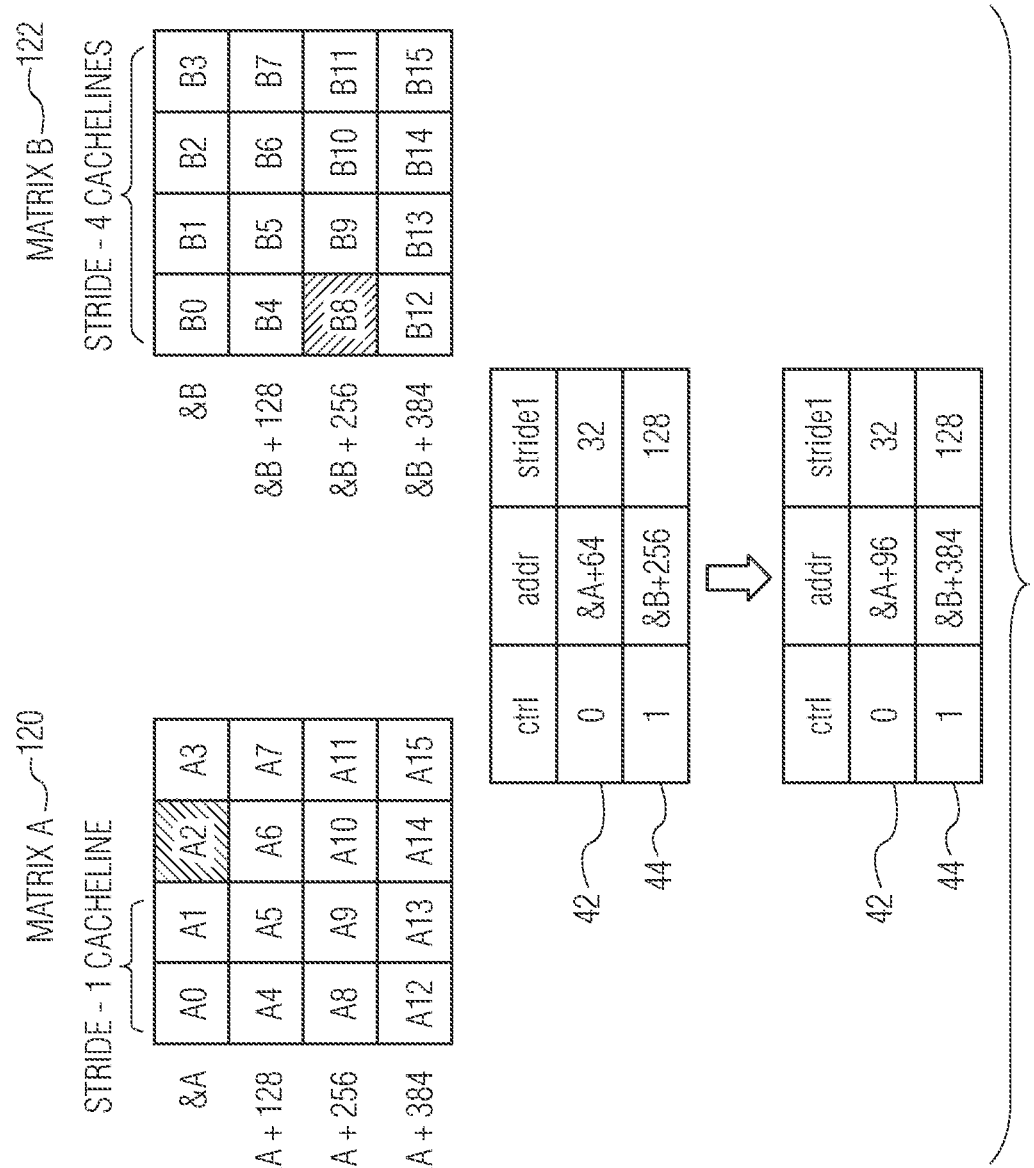

In FIG. 8, illustrating the continuation with the matrix multiplication at a later point in time, it is assumed that processor 12 provides read requests to access the highlighted matrix elements A2 (at address location &A+64) and B8 (at address location &B+385) so as to be able to continue with the matrix multiplication. (As above, these read accesses should also hit in cache 14 due to the previously performed pre-loads.) With these read requests, a cache line portion of an access address of a read request for A2 matches the pre-loaded cache line address &A+64 currently stored in ctrl0 42, and a cache line portion of an access address of a read access request for B4 matches the pre-loaded cache line address &B+256 currently stored in ctrl1 44. Due to these matches, new pre-loads from &A+stride1 (=&A+64+32=&A+96) and &B+stride1 (=&B+256+128=&B+385) are initiated from memory 20 into cache circuitry 30. Also, ctrl0 and ctrl1 are both updated. The addr field of ctrl0 42 is updated with the "addr+stride1" of ctrl0, which is &A+96. Similarly, the addr field of ctrl1 44 is updated with the "addr+stride1" of ctrl1 which is &B+384.

Figure 9:
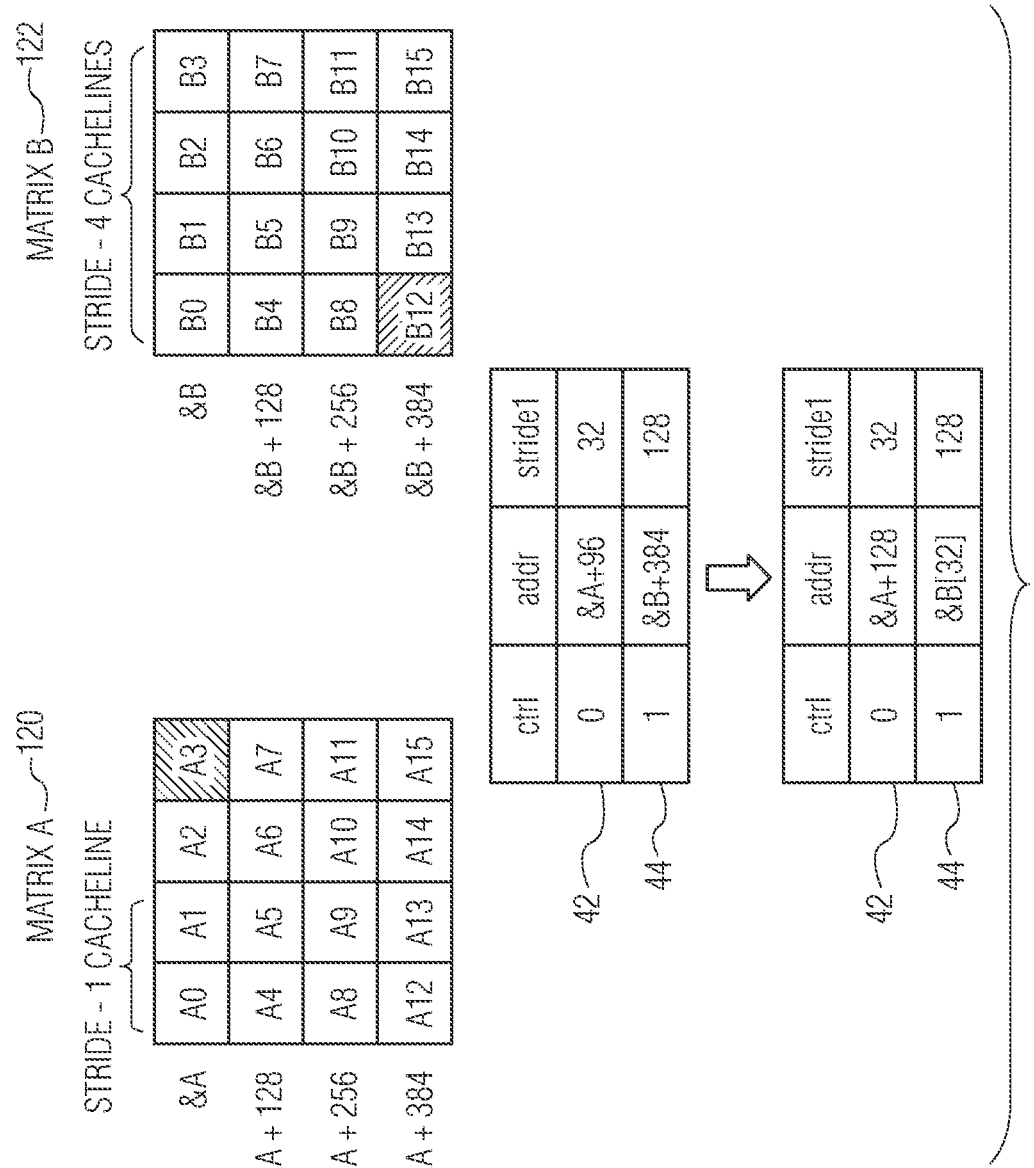

In FIG. 9, illustrating the continuation with the matrix multiplication at a later point in time, it is assumed that processor 12 provides read requests to access the highlighted matrix elements A3 (at address location &A+128) and B12 (at address &B+384) so as to be able to continue with the matrix multiplication. (As above, these read accesses should also hit in cache 14 due to the previously performed pre-loads.) Note that these read requests access the last elements in the first row of matrix A and the first column of matrix B. With this operation, a cache line portion of an access address of a read request for A3 matches the pre-loaded cache line address &A+64 currently stored in ctrl0 42, and a new pre-load from &A+stride1 (=&A+96+32=&A+128) is initiated from memory 20 into cache circuitry 30. Also, the addr field of ctrl0 42 is updated with the "addr+stride1" of ctrl0, which is &A+128. Note that &A+128 corresponds to the start of the next line of matrix A (storing A4-A7).

With respect to B12, a cache line portion of an access address of a read request for B12 matches the pre-loaded cache line address &B+384. However, at this point, pre-load control circuitry 36 resets the addr field of ctrl1 44 to &B[32] (corresponding to &B+32). This initiates a new pre-load from &B+32, which is the top element of the next column over of matrix B, corresponding to B1. The stride is maintained at 128 because the next cache line which will be needed is for element B5, which is &B[32]+128 (=&B+32+128=&B+160). In this manner, the matrix multiplication continues in which read requests for matrix elements continue to hit in cache 14 due to the proper pre-loading of cache circuitry 30. Note that without resetting ctrl1 44 for a next column of matrix B, and continuing with the previous settings, a pre-load of &B+384+128 would be initiated, which is not likely to be subsequently accessed for the A×B matrix multiplication, and thus does not help the efficiency of the matrix multiplication.

Figure 10:
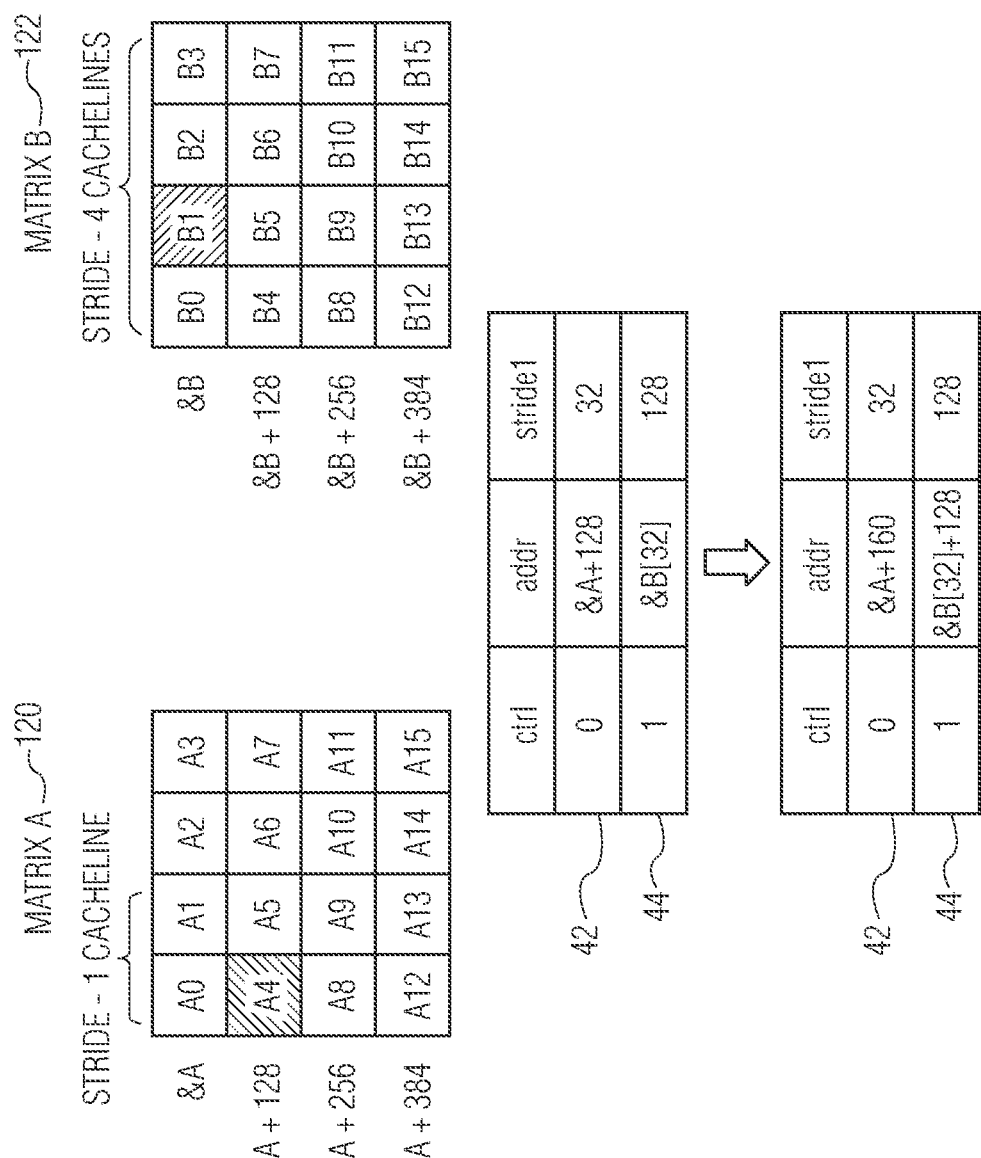

In FIG. 10, illustrating the continuation with the matrix multiplication at a later point in time, it is assumed that processor 12 accesses the highlighted matrix elements A4 (at &A+128) and B1 (at &B+32) so as to be able to continue with the matrix multiplication with the second row of matrix A and second column of matrix B. (These read accesses should also hit in cache 14 due to the previously performed pre-loads, including the pre-load initiated due to resetting the addr field of ctrl1 44.) With these read requests, an access address of a read request for A4 matches the pre-loaded cache line address &A+128 currently stored in ctrl0 42, and an access address of a read access request for B4 matches the pre-loaded cache line address &B[32] currently stored in ctrl1 44. Due to these matches, new pre-loads from &A+stride1 (=&A+128+32=&A+160) and &B+stride1 (=&B[32]+128=&B+160) are initiated from memory 20 into cache circuitry 30. Also, ctrl0 and ctrl1 are both updated. The addr field of ctrl0 42 is updated with the "addr+stride1" of ctrl0, which is &A+160. Similarly, the addr field of ctrl1 44 is updated with the "addr+stride" of ctrl which is &B[32]+128 (=&B+160).

In alternate embodiments, an additional stride value, such as the stride2 value stored in stride2 48, may be used by pre-load control circuitry 36 to further automate cache pre-loading. The stride2 value can be used in combination with counter reload 46 and counter 50. These elements may be used to handle a variety of different pre-load pattern changes, depending on the embodiment. For example, rather than having to reset the addr fields of the pre-load control registers each time a next row or a next column is to be accessed, counter 50 along with stride2 may be used to properly adjust the addr field of a corresponding control register to an address which is different from the subsequent address location provided by adding stride1. The stride2 value may either be a negative or positive value as needed. Also, depending on how the stride2 value is used, an additional storage circuit may be used to store a corresponding initial row address or a corresponding initial column address. Examples will be provided below with respect to the example of FIGS. 5-10, assuming that stride2, counter 50, and counter reload 46 correspond to ctrl1 44.

In an alternate embodiment for the example portion of the matrix multiplication of FIGS. 5-10, rather than resetting ctrl1 44 at the end of accessing each column of matrix B, as was discussed above in reference to FIG. 9, pre-load control circuitry 36 may also utilize counter reload 46, stride2 48, and counter 50. In this example, counter reload 46 can be 3, in which counter 50 decrements from 3 to 0, corresponding to the 4 rows of a column which need to be accessed before continuing with the next column. Therefore, initially, pre-load control circuitry 36, in addition to setting ctrl0 42 and ctrl1 44, resets counter 50 with the value of counter reload 46, which is 3. Also, a stride value of −352 bytes is loaded into stride2 48. This stride2 value allows a pre-load for the top element of the next column. Referring to FIG. 5, note that from the last element in a column, in order to access the top element of the next column, 384 bytes (equivalent to 12 cache lines of 32 bytes each) is subtracted from the current address and then 32 bytes (equivalent to 1 cache line) is added to reach the top element in the next column.

Therefore, referring back to FIG. 6, after initiating the pre-load from &B+128 and updating the addr field of cntrl1 44, counter 50 is also decremented from 3 to 2 (which corresponds to the no branch from decision diamond 92 through blocks 94, 96, and 98 of FIG. 4). In FIG. 7, after initiating the pre-load from &B+256 and updating the addr field of cntrl1 44, counter 50 is decremented from 2 to 1. In FIG. 8, after initiating the pre-load from &B+384 and updating the addr field of cntrl1 44, counter 50 is decremented from 1 to 0. Therefore, in FIG. 9, upon reaching decision diamond 92 of FIG. 4, method 80 continues with the yes branch through blocks 100, 102, and 104. Rather than initiating a pre-load from "pre-load cache line addr+corresponding stride1", a pre-load is instead initiated from "pre-load cache line addr+corresponding stride2". In this embodiment of FIG. 9, the addr field of cntrl1 44 is updated with "(&B+384)−352" which equals "&B+32", which corresponds to the address location of element B1 at the top of the next column. Also, before proceeding, counter 50 is reloaded with counter reload 46 (i.e. 3) such that at the end of the next column, the addr field of ctrl1 44 will be properly updated. In this manner, ctrl1 44 need not be reset by pre-load control circuitry 36 each time a jump to a different address location, which is not simply "the current address+stride1", is needed.

In an alternate embodiment using the example of FIGS. 5-10, stride2 can instead correspond to the stride needed to get from the top element of column to the top element of a next column. In this example, stride2 may be stored as 1 cache line (or 32 bytes). In this embodiment, though, pre-load control registers 40 would also store an "initial address" corresponding to stride2. This initial address is the address of the first location accessed of the current column. In this manner, in block 100, rather than initiating a pre-load from "pre-load cache line addr+stride2", a pre-load is initiated from "initial address+stride2". Also, in block 102, the addr field of ctrl1 44 is updated with "initial address+stride2". Therefore, referring to FIG. 5, the "initial address" is initialized to "&B" when counter 50 is reset to the value of counter reload 46. In FIG. 9, the addr field of ctrl1 44 is updated to "initial address+stride2" which is "&B+32". In block 104, when counter 50 is reloaded with the value in counter reload 46, the corresponding "initial address" is updated to the start of the current column, or "&B+32".

Note that the above two examples of stride2 were described in reference to accessing columns of a matrix. However, similar principles can be applied when accessing rows, in which counter 50 can be reloaded with a count value representative of the number of columns such that at the end of each row, the pre-load cache line address can be updated with the address of the first element in the next row. This may be the situation when accessing tiled matrices in which operations are being performed on a matrix residing inside a larger matrix. In this example, A4 is not sequentially stored in memory after A3, as in the example of FIGS. 5-10, but may be a "stride2" number of bytes away, in which stride2 can be used to pre-load for the next row to be accessed. Either method for using stride2 described above can be applied, in which in the embodiment using the "initial address", the "initial address" would be set to the address of the first element of the current row being pre-loaded.

In the above examples of stride2, stride2 is used as corresponding to ctrl1 44, which is used for matrix B. Alternatively, stride2, and "initial address" if present, can be used as corresponding to any of the control registers, such as any of ctrl0-ctrl3. Also, there may be multiple stride2 storage circuits (and corresponding "initial address" storage circuits, if needed) to correspond to any number of control registers in pre-load control registers 40. In these examples, additional counters and counter reload storage circuits may also be present for each stride2 value. The counter described herein, such as counter 50, is reset to the counter reload value 46 and is decremented each time until it expires (or reaches zero). However, in alternate embodiments, any of the counters in pre-load control registers 40 can be set to a first predetermined value and decremented or incremented each time until a second predetermined value is reached, in which the first predetermined value can be stored as the counter reload value and reaching the second predetermined value indicates the counter "has expired".

Although in the example FIGS. 5-10 above, each matrix element was assumed to be 1 cache line or 32 bytes, the elements of each matrix can be smaller than a cache line. For example, each element A0-15 may be 4 bytes. In this example, if the matrix elements are stored linearly in memory (e.g. A0 at &A, A1 at &A+4, A2 at &A+8, etc.), then a pre-load of a cache line may load multiple matrix elements into cache circuitry 30. In the example of FIGS. 5-10 in which elements in the first row of matrix A are accessed (A0-A3), no pre-load from "pre-load cache line addr+corresponding stride1" occurs until "the cache line address portion of the access address matches the pre-load cache line addr" in ctrl0 42. That is, if a subsequent read access hits in the same cache line as the previous read access, the cache line portion of the subsequent access will not match the pre-load cache line addr in the corresponding control register. Without a match, no additional pre-load is performed in response to that subsequent read access. When a pre-load of a cache line is performed, though, the addr field of the corresponding control register, ctrl0 42 for the above example with matrix A, is updated by adding the corresponding stride1 value. Until a memory access is performed to this updated cache line address, no subsequent pre-load is performed. In this manner, in the example of each element of matrix A being 4 bytes, after pre-loading the 32 byte cache line from &A, a next pre-load is not performed until the cache line address of a read access address matches "&A+32" (which would not occur until a read access to the $8^{th}$ 4-byte element of the matrix (e.g. A7) is requested).

Note that each received read access request from processor 12 is provided in parallel to both cache control circuitry for determining a hit or miss in cache circuitry 30 and pre-load control circuitry for determining if a pre-load is to be initiated. Note that the processing by cache control circuitry 34 can occur while the processing by pre-load control circuitry 36 is occurring. The pre-loads initiated by pre-load control circuitry can occur regardless of whether the received read access request results in a hit or a miss in cache circuitry 30. Therefore, the use of pre-load control circuitry and pre-load control registers does not interfere with normal operation of cache control circuitry 34 and cache circuitry 30, but simply attempts to pre-load information in an intelligent manner so as to make operation of cache circuitry 30 more efficient, hopefully resulting in more cache hits as compared to not performing any pre-loads by pre-load control circuitry 36.

Therefore, by now it can be appreciated how, through the use of pre-load control circuitry and pre-load control registers, read accesses can be monitored to control cache pre-loading for improved cache efficiency. The pre-loading described herein can improve cache efficiency for code which implements a large number of loops without impacting loop time. Such loop intensive code is common in ML/AI applications. Also, through the use of different stored stride values, pre-load control circuitry can provide improved cache pre-loading control, even when the accessed values are not stored in a linear fashion.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Also for example, in one embodiment, the illustrated elements of system 10 are circuitry located on a single integrated circuit or within a same device. Alternatively, system 10 may include any number of separate integrated circuits or separate devices interconnected with each other. For example, memory 20 may be located on a same integrated circuit as processor 12 or on a separate integrated circuit or located within another peripheral or slave discretely separate from other elements of system 10. Peripherals 16 also be located on separate integrated circuits or devices.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments. For example, the initiating of blocks 72, 94, and 100 can be performed simultaneously with or prior to the updating of blocks 74, 96, and 102, respectively. Also, the decrementing the count value of block 98 and reloading the count value of block 104 can be performed at other times with respect to blocks 94/96 and blocks 100/102, respectively, than as illustrated in FIGS. 3 and 4.

Although the invention is described herein with reference to specific embodiments, various modifications and changes can be made without departing from the scope of the present invention as set forth in the claims below. For example, different counter implementations may be used and can be implemented as increasing or decreasing a predetermined number of times in accordance with a counter reload value. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

The following are various embodiments of the present invention.

In one embodiment, a data processing system includes a processor; a memory coupled to the processor; and a cache coupled to the processor. The cache includes a cache array configured to store a plurality of cache lines each having a corresponding tag address field and a data field; cache control circuitry coupled to the cache array and coupled to receive an access address corresponding to a read access request from the processor and configured to determine whether the received access address hits or misses in the cache array; pre-load control storage circuitry, outside the cache array, configured to store a pre-load cache line address and a corresponding stride value; and pre-load control circuitry coupled to the cache control circuitry and the pre-load control storage circuitry, and configured to receive the access address corresponding to the read access request from the processor and selectively initiating a pre-load from the memory to the cache based on whether a cache line address portion of the access address matches the stored pre-load cache line address. In one aspect of this embodiment, the pre-load control circuitry is configured to initiate the pre-load when the cache line address portion of the access address matches the stored pre-load cache line address. In a further aspect, when the cache line address portion of the access address matches the stored pre-load cache line address, the initiated pre-load loads a cache line into the cache array from a calculated address location of the memory, wherein the calculated address location is calculated using the stored cache line address and the corresponding stride. In yet a further aspect, when the cache line address portion of the access address matches the stored pre-load cache line address, updating the preload cache line address stored in the pre-load control storage circuitry with the calculated address location. In another aspect, when the cache line address portion of the access address matches the stored pre-load cache line address, the pre-load is initiated regardless of whether the access address hits or misses in the cache array. In yet another aspect, the pre-load control storage circuitry further includes a counter and is configured to store a second stride value and a counter reload value, wherein the counter is configured to update its corresponding count value each time a cache line address portion of a read access address received from the processor matches the stored pre-load cache line address. In a further aspect, when the cache line address portion of the access address matches the stored pre-load cache line address and the counter has reached a predetermined value: the initiated pre-load loads a cache line into the cache array from a calculated address location of the memory which is calculated using the stored cache line address and the second stride value, the preload cache line address stored in the pre-load control storage circuitry is updated with the calculated address location, and the counter is reset to the counter reload value. In another further aspect, the pre-load cache control storage circuitry is configured to store an initial address corresponding to the second stride value, wherein when the cache line address portion of the access address matches the stored pre-load cache line address and the counter has reached a predetermined value: the initiated pre-load loads a cache line into the cache array from a calculated address location of the memory which is calculated using the initial address and the second stride value, the initial address is updated with the calculated address location, and the counter is reset to the counter reload value. In yet another further aspect, when the cache line address portion of the access address matches the stored pre-load cache line address and the counter has not reached a predetermined value: the initiated pre-load loads a cache line into the cache array from an address location in the memory calculated using the stored cache line address and the corresponding stride. In yet another aspect of the embodiment, the cache control circuitry and the pre-load control circuitry receive the access address corresponding to the read access request from the processor in parallel with each other.

In another embodiment, in a data processing system having a cache array and a memory, a method includes storing a pre-load cache line address and a corresponding stride value into pre-load control storage circuitry which is independent of the cache array; receiving a read address request for the memory, wherein the read request has a corresponding access address; and when the received access address matches the pre-load cache line address: initiating a pre-load of a cache line into the cache from a calculated address location of the memory which is calculated using the pre-load cache line address and the corresponding stride, and updating the pre-load cache line address in the pre-load control storage circuitry with the calculated address location while maintaining the corresponding stride value unchanged. In one aspect of the another embodiment, the method further includes when the received address does not match the pre-load cache line address, not initiating the pre-load of the cache line from the calculated address location and not updating the stored pre-load cache line address with the calculated address location. In another aspect, after initiating the pre-load of the cache line into the cache array from a calculated address location and updating the stored pre-load cache line with the calculated address location, the method further includes receiving a second access address request for the memory, wherein the second read request has a corresponding second access address; if the received second access address matches the updated pre-load cache line address: initiating a pre-load of a cache line into the cache array from a second calculated address location of the memory which is calculated using the updated pre-load cache line address and the corresponding stride, and updating the pre-load cache line address in the pre-load control storage circuitry with the second calculated address location; and if the received second access address does not match the updated pre-load cache line address, not performing a cache line pre-load from the memory into the cache array in response to the received second access address. In another aspect, the method further includes, in response to receiving the read address request for the memory and the corresponding access address, determining whether the access address results in a hit or a miss in the cache array. In another aspect, the updating is performed simultaneously with or prior to the initiating.

In yet another embodiment, in a data processing system having a cache array and a memory, a method includes storing a pre-load cache line address, a first stride value which corresponds to the pre-load cache line address, and a second stride value into pre-load control storage circuitry which is independent of the cache array; resetting a counter to a first count value; after the storing and the resetting, receiving a read address request for the memory, wherein the read request has a corresponding access address; and when the received access address matches the pre-load cache line address and the counter has not expired: initiating a pre-load of a cache line into the cache from a first calculated address location of the memory which is calculated using the pre-load cache line address and the first stride value, updating the pre-load cache line address in the pre-load control storage circuitry with the first calculated address location while maintaining the first stride value unchanged, and performing one of incrementing or decrementing the first count value; and when the received access address matches the pre-load cache line address and the counter has expired: initiating a pre-load of a cache line into the cache from a second calculated address location of the memory which is calculated using at least the second stride value, updating the pre-load cache line address in the pre-load control storage circuitry with the second calculated address location while maintaining the second stride value unchanged, and resetting the counter to the first count value. In one aspect of the yet another embodiment, the method further includes, in response to receiving the read address request for the memory and the corresponding access address, determining whether the access address results in a hit or a miss in the cache array. In another aspect, when the counter has expired, the counter equals a second count value, and when the counter has not expired, the counter does not equal the second count value. In another aspect, when the received access address matches the pre-load cache line address and the counter has expired, the second calculated address location of the memory is calculated using the using the pre-load cache line address and the second stride value. In yet another aspect, the method further includes storing an initial pre-load cache line address corresponding to the second stride value into the pre-load control storage circuitry; wherein when the received access address matches the pre-load cache line address and the counter has expired, the second calculated address location of the memory is calculated using the using the initial pre-load cache line address and the second stride value.

What is claimed is:

1. A data processing system, comprising:
a processor;
a memory coupled to the processor; and
a cache coupled to the processor, the cache having:
    a cache array configured to store a plurality of cache lines each having a corresponding tag address field and a data field;
    cache control circuitry coupled to the cache array and coupled to receive an access address corresponding to a read access request from the processor and configured to determine whether the received access address hits or misses in the cache array;
    pre-load control storage circuitry, outside the cache array, configured to store a pre-load cache line address and a corresponding stride value; and
    pre-load control circuitry coupled to the cache control circuitry and the pre-load control storage circuitry, and configured to receive the access address corresponding to the read access request from the processor and selectively initiating a pre-load from the memory to the cache based on whether a cache line address portion of the access address matches the stored pre-load cache line address, wherein the pre-load control circuitry is configured to initiate the pre-load when the cache line address portion of the access address matches the stored pre-load cache line address in which the pre-load is initiated regardless of whether the access address hits or misses in the cache array.

2. The data processing system of claim 1, wherein when the cache line address portion of the access address matches the stored pre-load cache line address, the initiated pre-load loads a cache line into the cache array from a calculated address location of the memory, wherein the calculated address location is calculated using the stored cache line address and the corresponding stride.

3. The data processing system claim 2, wherein when the cache line address portion of the access address matches the stored pre-load cache line address, updating the preload cache line address stored in the pre-load control storage circuitry with the calculated address location.

4. A data processing system, comprising:
a processor;
a memory coupled to the processor; and
a cache coupled to the processor, the cache having:
    a cache array configured to store a plurality of cache lines each having a corresponding tag address field and a data field;
    cache control circuitry coupled to the cache array and coupled to receive an access address corresponding to a read access request from the processor and configured to determine whether the received access address hits or misses in the cache array;
    pre-load control storage circuitry, outside the cache array, configured to store a pre-load cache line address and a corresponding stride value; and
    pre-load control circuitry coupled to the cache control circuitry and the pre-load control storage circuitry, and configured to receive the access address corresponding to the read access request from the processor and selectively initiating a pre-load from the memory to the cache based on whether a cache line address portion of the access address matches the stored pre-load cache line address, wherein the cache control circuitry and the pre-load control circuitry receive the access address corresponding to the read access request from the processor in parallel with each other.

5. The data processing system of claim 4, wherein the pre-load control circuitry is configured to initiate the pre-load when the cache line address portion of the access address matches the stored pre-load cache line address.

6. The data processing system of claim 5, wherein when the cache line address portion of the access address matches the stored pre-load cache line address, the pre-load is initiated regardless of whether the access address hits or misses in the cache array.

7. A data processing system, comprising:
a processor;
a memory coupled to the processor; and
a cache coupled to the processor, the cache having:
    a cache array configured to store a plurality of cache lines each having a corresponding tag address field and a data field;
    cache control circuitry coupled to the cache array and coupled to receive an access address corresponding to a read access request from the processor and configured to determine whether the received access address hits or misses in the cache array;
    pre-load control storage circuitry, outside the cache array, configured to store a pre-load cache line address and a corresponding stride value; and
pre-load control circuitry coupled to the cache control circuitry and the pre-load control storage circuitry, and configured to receive the access address corresponding to the read access request from the processor and selectively initiate a pre-load from the memory to the cache based on whether a cache line address portion of the access address matches the stored pre-load cache line address, wherein the pre-load control circuitry is configured to initiate the pre-load when the cache line address portion of the access address matches the stored pre-load cache line address, and wherein the pre-load control storage circuitry further comprises a counter and is configured to store a second stride value and a counter reload value, wherein the counter is configured to update its corresponding count value each time a cache line address portion of a read access address received from the processor matches the stored pre-load cache line address.

8. The data processing system of claim 7, wherein when the cache line address portion of the access address matches the stored pre-load cache line address and the counter has reached a predetermined value:
the initiated pre-load loads a cache line into the cache array from a calculated address location of the memory which is calculated using the stored cache line address and the second stride value,
the preload cache line address stored in the pre-load control storage circuitry is updated with the calculated address location, and
the counter is reset to the counter reload value.

9. The data processing system of claim 7, wherein the pre-load cache control storage circuitry is configured to store an initial address corresponding to the second stride value, wherein when the cache line address portion of the access address matches the stored pre-load cache line address and the counter has reached a predetermined value:
the initiated pre-load loads a cache line into the cache array from a calculated address location of the memory which is calculated using the initial address and the second stride value,
the initial address is updated with the calculated address location, and
the counter is reset to the counter reload value.

10. The data processing system of claim 7, wherein when the cache line address portion of the access address matches the stored pre-load cache line address and the counter has not reached a predetermined value:
the initiated pre-load loads a cache line into the cache array from an address location in the memory calculated using the stored cache line address and the corresponding stride.

11. In a data processing system having a cache array and a memory, a method comprises:
storing a pre-load cache line address and a corresponding stride value into pre-load control storage circuitry which is independent of the cache array;
receiving a read address request for the memory, wherein the read request has a corresponding access address; and
when the received access address matches the pre-load cache line address:
initiating a pre-load of a cache line into the cache from a calculated address location of the memory which is calculated using the pre-load cache line address and the corresponding stride, and
updating the pre-load cache line address in the pre-load control storage circuitry with the calculated address location while maintaining the corresponding stride value unchanged.

12. The method of claim 11, further comprising:
when the received address does not match the pre-load cache line address, not initiating the pre-load of the cache line from the calculated address location and not updating the stored pre-load cache line address with the calculated address location.

13. The method of claim 11, wherein after initiating the pre-load of the cache line into the cache array from a calculated address location and updating the stored pre-load cache line with the calculated address location, the method further comprises:
receiving a second access address request for the memory, wherein the second read request has a corresponding second access address;
if the received second access address matches the updated pre-load cache line address:
initiating a pre-load of a cache line into the cache array from a second calculated address location of the memory which is calculated using the updated pre-load cache line address and the corresponding stride, and
updating the pre-load cache line address in the pre-load control storage circuitry with the second calculated address location; and
if the received second access address does not match the updated pre-load cache line address, not performing a cache line pre-load from the memory into the cache array in response to the received second access address.

14. The method of claim 11, further comprising:
in response to receiving the read address request for the memory and the corresponding access address, determining whether the access address results in a hit or a miss in the cache array.

15. The method of claim 11, wherein the updating is performed simultaneously with or prior to the initiating.

16. In a data processing system having a cache array and a memory, a method comprises:
storing a pre-load cache line address, a first stride value which corresponds to the pre-load cache line address, and a second stride value into pre-load control storage circuitry which is independent of the cache array;
resetting a counter to a first count value;
after the storing and the resetting, receiving a read address request for the memory, wherein the read request has a corresponding access address; and
when the received access address matches the pre-load cache line address and the counter has not expired:
initiating a pre-load of a cache line into the cache from a first calculated address location of the memory which is calculated using the pre-load cache line address and the first stride value,
updating the pre-load cache line address in the pre-load control storage circuitry with the first calculated address location while maintaining the first stride value unchanged, and
performing one of incrementing or decrementing the first count value; and
when the received access address matches the pre-load cache line address and the counter has expired:
initiating a pre-load of a cache line into the cache from a second calculated address location of the memory which is calculated using at least the second stride value,
updating the pre-load cache line address in the pre-load control storage circuitry with the second calculated address location while maintaining the second stride value unchanged, and
resetting the counter to the first count value.

17. The method of claim 16, further comprising:
in response to receiving the read address request for the memory and the corresponding access address, determining whether the access address results in a hit or a miss in the cache array.

18. The method of claim 16, wherein when the counter has expired, the counter equals a second count value, and when the counter has not expired, the counter does not equal the second count value.

19. The method of claim 16, wherein when the received access address matches the pre-load cache line address and the counter has expired, the second calculated address location of the memory is calculated using the using the pre-load cache line address and the second stride value.

20. The method of claim 16, further comprising:
   storing an initial pre-load cache line address corresponding to the second stride value into the pre-load control storage circuitry;
   wherein when the received access address matches the pre-load cache line address and the counter has expired, the second calculated address location of the memory is calculated using the using the initial pre-load cache line address and the second stride value.

\* \* \* \* \*